Figure 1:
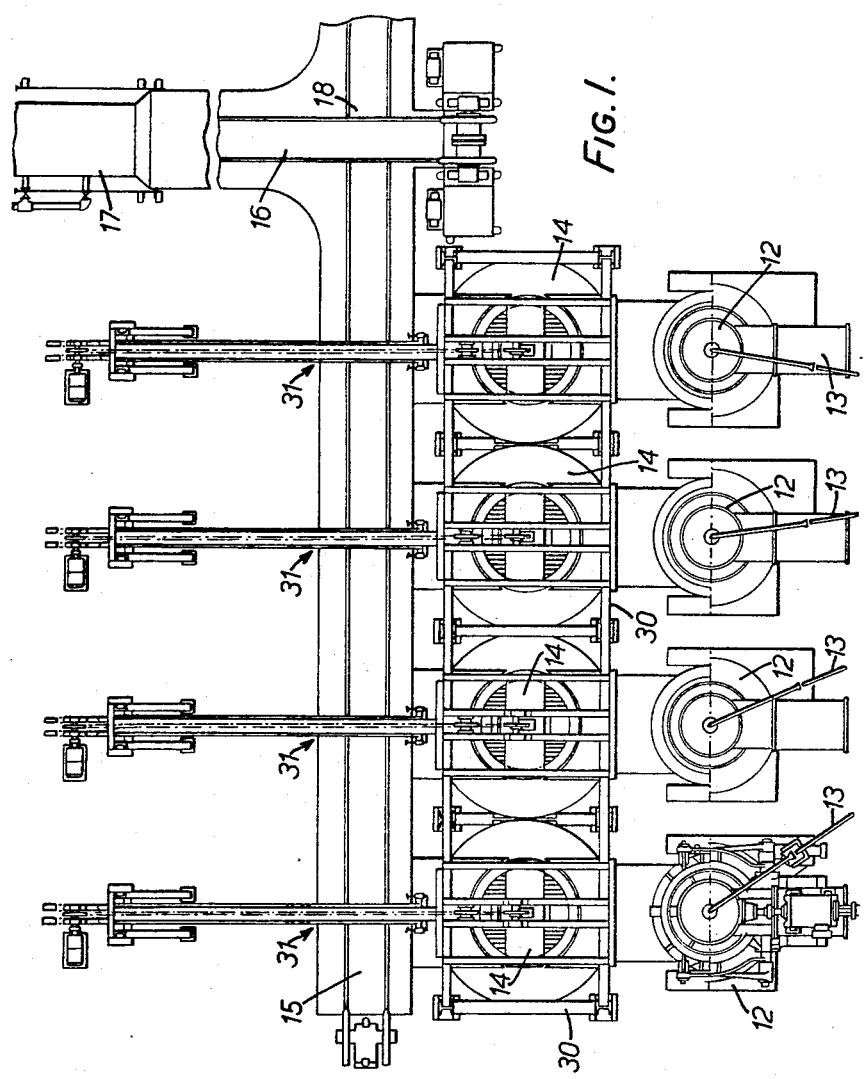

Oct. 4, 1966  R. B. SIMS  3,276,920
HEAT TREATMENT

Filed Dec. 18, 1963  5 Sheets-Sheet 1

INVENTOR
RAYMOND B. SIMS
BY
Holcombe, Wetherill + Brisebois
ATTORNEYS

Oct. 4, 1966  R. B. SIMS  3,276,920
HEAT TREATMENT
Filed Dec. 18, 1963  5 Sheets-Sheet 2
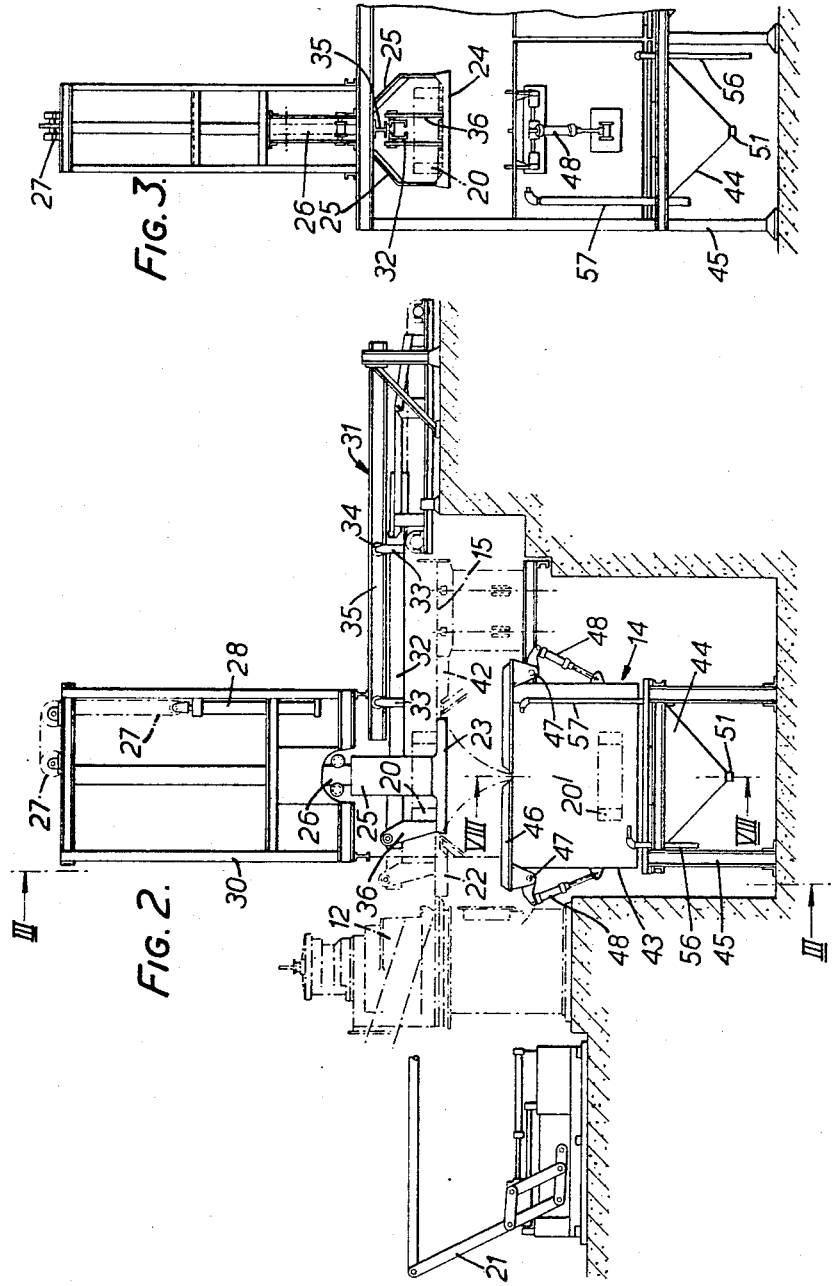
INVENTOR
RAYMOND B. SIMS
BY
Holcombe, Wetherill + Brisebois
ATTORNEYS

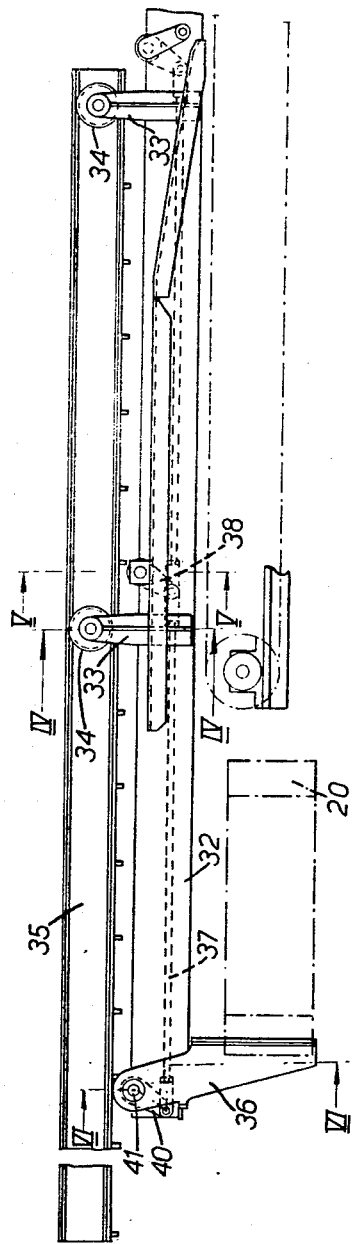

Oct. 4, 1966  R. B. SIMS  3,276,920
HEAT TREATMENT

Filed Dec. 18, 1963  5 Sheets-Sheet 4

INVENTOR
RAYMOND B. SIMS
BY
Holcombe, Wetherill & Brisebois
ATTORNEYS

Oct. 4, 1966  R. B. SIMS  3,276,920
HEAT TREATMENT
Filed Dec. 18, 1963  5 Sheets-Sheet 5
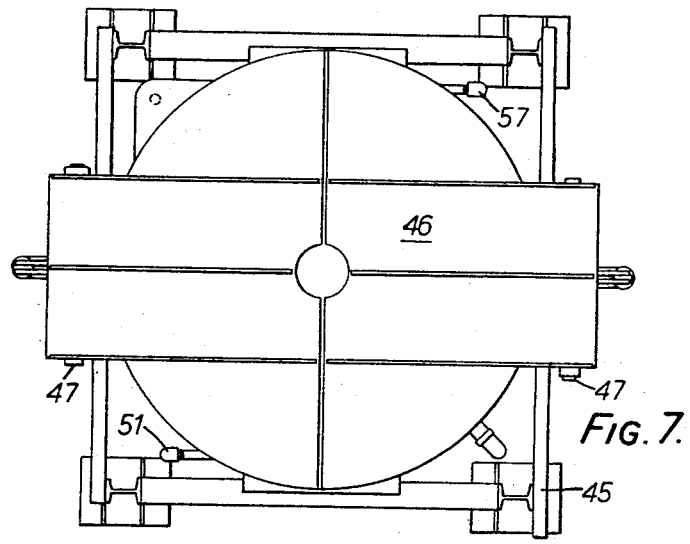
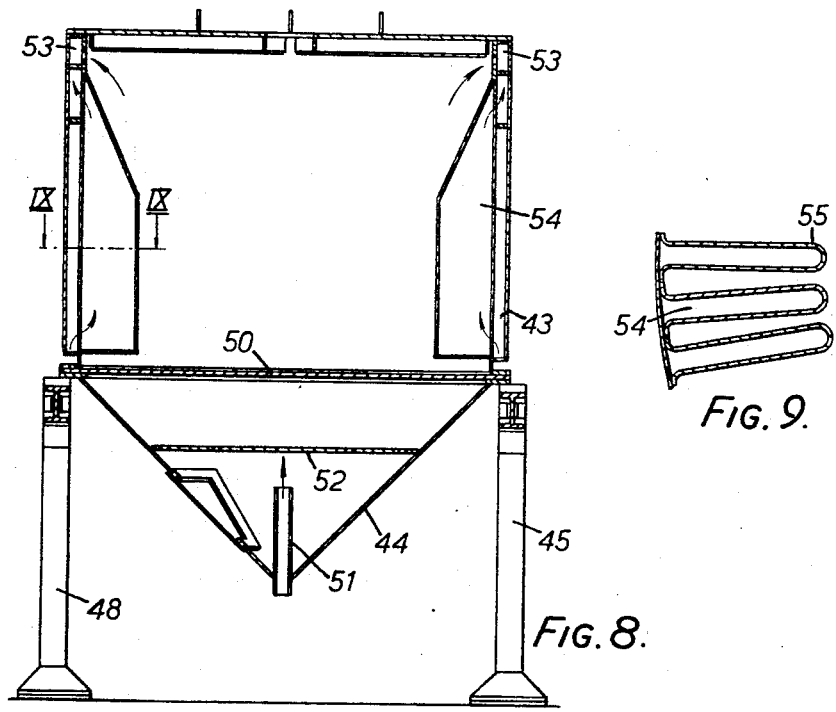
INVENTOR
RAYMOND B. SIMS
BY
Holcombe, Wetherill & Brisebois
ATTORNEYS

United States Patent Office 3,276,920
Patented Oct. 4, 1966

3,276,920
HEAT TREATMENT
Raymond Bernard Sims, Sheffield, England, assignor to Davy and United Engineering Company Limited, Sheffield, England
Filed Dec. 18, 1963, Ser. No. 331,409
Claims priority, application Great Britain, Dec. 21, 1962, 48,431/62; Sept. 6, 1963, 35,242/63
11 Claims. (Cl. 148—14)

This invention relates to the heat treatment of elongate metal material and particularly of steel rod. The invention is particularly advantageous when applied to steel rod having a carbon content between 0.40% to 0.85%, which rod should have a very closely specified metallurgical structure, if it is to be subsequently reduced such as by being drawn into wire. In that particular case the structure of the rod is, ideally, fine pearlite, sometimes referred to as sorbite.

Hitherto the rod leaving the mill at a temperature of about 1,000° C. has been coiled and then transferred to a conveyor where it has been left for at least ¾ hour to cool in the air. During this process a relatively large amount of scale is formed on the rod, and a coarse pearlitic structure is formed. This structure has been found to be detrimental in certain wire drawing processes, since to attain a large area reduction, the rod has to be subjected to further heat treatment both before and at an intermediate stage of the drawing process.

Prior arrangements aimed at improving the structure of the rod leaving a rod mill, and reducing the amount of scale formed, have been suggested. In one instance, air is blown through the rod coiling apparatus, but while this has to some extent improved the structure of the rod, the temperature throughout the coil varies considerably, and hence there is considerable variation in the metallurgical structure through the coil. Furthermore, the cooling rates needed to produce any appreciable improvement in structure, have only been achieved for rods of small diameter, by this method.

In a further instance, the strands of the rod have been intermittently sprayed with water whilst passing from the last stand of the mill to the coiler. Here again, some improvement in the structure of the rod has been achieved, but the arrangement does not lend itself for use with modern high speed skills, since, due to the speed at which the rod leaves the mill, an excessively long heat treatment section is required to reduce the temperature to that required for the isothermal transformation to fine pearlite to take place as it enters the coiler. Furthermore, this method requires an extremely complicated control system, capable of correcting for variations in the speed, cross-sectional area and temperature of the rod leaving the mill.

In one aspect the present invention provides a method of heat treating steel rod comprising coiling the rod as it leaves a rolling mill, bringing the hot coiled rod into heat-exchange relationship with an environment in which heat is continuously transferred from the coil to the environment at a transfer rate within the range 175 to 225 British Thermal units per minute per pound weight of the coil.

We have found that, when treating steel rod of 0.212" diameter and containing 0.70% carbon, an average heat transfer rate of 189 British Thermal units per minute per pound weight of the coil causes the rod to have a grain structure including sufficient fine pearlite to permit a reduction in area by drawing of 80% without further heat treatment.

In another aspect the invention provides a method of heat treating rod, which comprises coiling the rod as it leaves a rolling mill, and immediately immersing the rod in a fluidised bed to cool the rod rapidly to a temperature below 700° C.

Whilst providing an environment capable of transferring heat from the coil at the required rate, the use of a fluidised bed also provides a substantially uniform heat transfer rate from all surfaces of the coil to the bed, and consequently a more nearly uniform structure of the rod is achieved. Furthermore, the fluidised bed itself is substantially isothermal due to the extremely high heat transfer capability of the fluidised environment, so that control of the heat transfer rate from the coil to the bed can be simply and inexpensively achieved by varying the mass flow rate of the fluidising gas. A small increase in the mass flow of the fluidising medium over that required for minimum fluidisation, results in a significant increase in the heat transfer coefficient of the bed, so that the heat transfer rate from the coil to the bed is significantly increased. A fluidised bed is therefore particularly suitable for heat treating coils of rod issuing from a rod mill, since the heat transfer rate can be readily adjusted to provide the optimum cooling rate for steels of different carbon content.

The heat transfer rate from the coil to the bed can also be varied by varying the temperature of the fluidising gas.

In another aspect the invention provides a method of heat treating rod, which comprises coiling the rod as it leaves a rolling mill, and bringing the hot coiled rod into heat-exchange relationship with an enviroment of fluidised particulate or granular material, the fluidised environment having a heat storage capacity sufficient to contain the heat transferred from the coil when the coil is cooled to 700° C.

We have found that a fluidised bed of a size sufficient only to permit convenient entry and exit of a typical coil of rod and its conveying means, has a heat storage capacity sufficient to contain the heat given off by the coil when it is cooled from 1,000° C. to 700° C. Of course, some heat is conveyed from the bed by the fluidising gas, but this is a relatively small quantity when compared with that remaining in the fluidised bed.

In yet another aspect the invention provides: a coiler for coiling the rod as it issues from a rolling mill; a fluidised bed within a container; means to transfer the coils from the coiler to the fluidised bed; and means to cool the walls of the container. With this arrangement the fluidised bed can be used continuously for cooling successive coils, since the means for cooling the walls of the container can be arranged to transfer heat from the bed at a rate sufficient to reduce its temperature and restore its heat storage capacity between the cooling of each coil.

If the coil is allowed to remain in the fluidised bed for a period of time longer than is necessary for the required heat treatment process to be completed, the temperature of the coil can be further and rapidly reduced, so that the coil may be readily handled by conveying equipment without the danger of deformation.

In a preferred form arranged to achieve a fine pearlitic structure in carbon steel rod, the invention provides a method of heat treating the rod, which comprises coiling the rod as it leaves a rolling mill, immersing the rod in a fluidised bed before its temperature has cooled below the austenitic-ferritic change point, and cooling the rod in the fluidised bed at such a rate that, the temperature of the rod is lowered between the austenitic-ferritic change point and the upper limit of the range in which fine pearlite is formed in not more than 4 seconds, and maintaining the rod at a temperature within the said range for a period of time in the range 10 to 30 seconds.

Thereafter the coil of rod may be removed from the fluidised bed and, if desired, further rapidly cooled by immersion in a water bath, or spraying with water.

The rapid cooling of the rod, in the preferred form of the invention, between the austenitic-ferritic change point (720° C. for 0.70% carbon steel), and the upper limit of the range in which fine pearlite is formed (650° C. for 0.70% carbon steel), ensures that the rod does not form undesirable martensitic structure; while maintenance of the rod within the temperature range in which fine pearlite is formed (650° C. to 550° C. for 0.70% carbon steel) for the said period of time ensures that a fine pearlitic structure is formed.

Although in the preferred form of the invention, the rate of cooling in the fluidised bed is selected to form a fine pearlitic structure in the rod, it should be appreciated that the method according to the invention may be applied to rod, made for example of mild steel which does not form a fine pearlitic structure, since a remarkable reduction in scale is achieved by the method according to the invention, when compared with the atmospheric cooling method and the air-blown rod coiling method referred to above.

The invention further provides apparatus for carrying out the above method.

As well as reducing the scale formed on the rod, and providing rod on which, when being drawn into wire, a substantial reduction may be effected before the necessity for further heat treatment, the invention provides a more compact apparatus for cooling the rod, and considerable time saving.

Preferably the containers in which the rod is coiled are designed to minimize radiation losses of heat from the coil.

In a preferred form of apparatus, a pusher is provided for pushing the coil from the coiler onto a cradle located above a fluidised bed and means are provided for lowering the coil vertically into the fluidised bed. When the coil has been submited to the controlled temperature of the fluidised bed for the required time, the cradle is raised to its former level and a puller bar extracts the coil from the cradle on the opposite side from that on which it entered.

Figure 5:
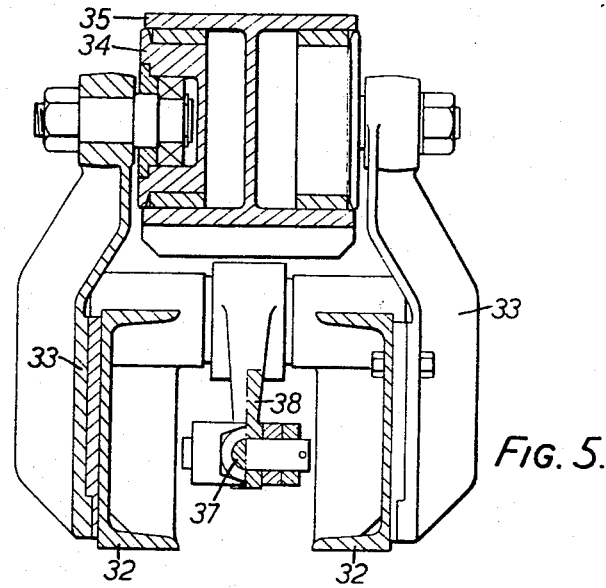
Figure 6:
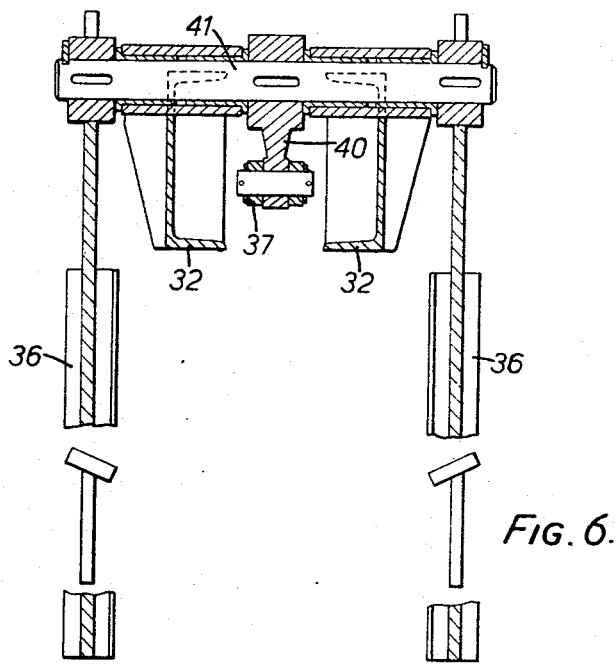

One embodiment of apparatus in accordance with the invention for heat treating rod as it leaves a rolling mill, will now be described, by way of example only, with reference to the accompanying drawings of which:

FIGURE 1 is a plan of a unit for heat treating coiled rod from a four strand mill to obtain a fine pearlitic structure, FIGURE 2 is a side view of the apparatus for treating one coil of rod, FIGURE 3 is a view on the line III—III of FIGURE 2 showing the mechanism for raising and lowering a coil, FIGURE 4 is a side view of the transfer mechanism for removing the coil after treatment in the fluidised bed, FIGURE 5 is a sectional view of the apparatus shown in FIGURE 4 the left-hand half of the figure being on the line IV—IV and the right-hand half of the figure being on the line V—V, FIGURE 6 is a section on the line VI—VI of FIGURE 4, FIGURE 7 is a plan view of the fluidised bed, FIGURE 8 is a section through the fluidised bed on the line VIII—VIII of FIGURE 2, and FIGURE 9 is a section on the line IX—IX of FIGURE 8.

FIGURES 1 and 2 show four coilers 12 of the eight coilers which coil the individual strands 13 from a four strand rod mill. Four fluidised beds 14 are associated with the coilers and are located below ground level.

A cross conveyor 15 receives coils from each fluidised bed and conveys them to a further conveyor 16 which leads to a spray booth 17 for further cooling. A similar series of fluidised beds and coilers (not shown) located on the opposite side of the conveyor 16 also supplies coils by means of conveyor 18 to the conveyor 16.

The outer wall of each coiler is retractable to allow a coil 20 formed therein to be pushed by a hydraulically operated pusher mechanism 21 via a support table 22 onto a cradle 23, located above the fluidised bed 14.

Each cradle 23 is formed by a horizontal perforated grid 24, on which the coil is supported, and two side plates 25, shown most clearly in FIGURE 3. This arrangement allows a coil to enter or leave the cradle on either of the open sides. Each cradle is supported for vertical movement by a bar 26 secured to the top of plates 25 and connected through a chain and pulley system 27 to a piston and cylinder assembly 28 supported by a frame 30. This allows the coil to be lowered into the fluidised bed to the position shown in chain line at 20.

A pulley mechanism 31 is provided on the other side of the fluidised bed for transferring a coil, which has been immersed in the fluidised bed, onto the conveyor 15.

As shown in FIGURES 2 to 5 this mechanism 31 is formed by a bar 32 supported by links 33 secured to rollers 34 which ride in fixed rails 35 for longitudinal movement relative thereto. In FIGURE 2 this bar is shown in the forward position while in FIGURE 4 it is shown in its withdrawn position.

On either side of the bar 32 at the end nearest the fluidised beds, pusher arms 36 are pivotally mounted. A rod 37 is supported within bar 32, for longitudinal movement relative thereto, by pivotally mounted links 38. As shown in FIGURE 6, the end of the rod 37 is pivotally connected to one end of a link 40, the other end of which is rigidly connected to a rotatably mounted shaft 41. The arms 36 are connected to the shaft 41 for rotation therewith. Rod 37 is thus operable to raise the arms 36 to a position in line with the bar 32 to avoid interference with a coil in the cradle, and to lower the arms into line with the coil, to a position in which, as the bars 32 is moved to the right in FIGURE 2, the arms engage the coil and pull it over a support table 42 onto the cross conveyor 15.

The fluidised beds 14, shown in FIGURES 2, 3 and 7–9 are formed from a cylindrical body 43 having a conical base 44 and supported on a frame 45. A lid 46 is formed in two halves each pivotable about an axis 47 by means of a cylindrical assembly 48 for opening and closing purposes.

The granular material is supported on a perforated plate 50 at the base of the cylindrical body.

The granular material may be sand and the fluidising gas may be one which will not cause the metal to scale, such as nitrogen, or as in the present case an air blast may be used since only a small amount of scale is produced during the relatively short heat treatment cycle and this scale is partly removed by the impact of the granular material of the fluidised bed on the coil.

Fluidising gas is supplied through an inlet tube 51 projecting into the conical base of the bed, through a perforated plate 52, and through the plate 50 to fluidise the bed. The gas is extracted at the top of the cylindrical body through tubes 53.

The inside wall of the fluidised bed container is corrugated to increase the area of the cooling surface as shown in FIGURE 9. Cooling water is supplied through water inlet tubes 56 to the base of the container, and passes upwardly through the spaces 54 to be extracted through tubes 57 from the top of the cylindrical body. The flow of cooling water can be adjusted to select the required heat transfer rate from the fluidised bed. Once selected the coolant flow rate need not be adjusted during the heat treatment of the coil therein, since the change which takes place in the steel during transformation of the structure to fine pearlite, is exothermic, thus maintaining the temperature of the coil within the required range for the required time.

Instead of water, the cooling fluid may be a liquid alkali metal, or a lead-bismuth alloy, or a gas such as carbon-dioxides; the fluid in each case being circulated around a closed circuit and cooled in the cold-pass of a heat exchanger. Alternatively if water is used this may be fed to the boiler of a steam raising plant.

In order to remove sand remaining in the coil after its treatment in the fluidised bed, means may be arranged to blow air or other suitable gas, onto the coil as it is hauled upwardly in the cradle 23. Alternatively, means may be provided to vibrate the cradle 23 so that sand remaining on the coil will be shaken off. In practice we have found that very little sand remains between the strands of the coil.

The coilers 12 are designed to reduce radiation heat loss from the rod which is being coiled, in order to maintain the coil above the austenitic-ferritic change point until it is transferred to a fluidised bed. In one design, the coilers are lined with polished stainless steel reflectors.

By means of this apparatus a rod strand is coiled as it leaves the rolling mill, and the hot coil is rapidly transferred to the fluidised bed in which it is immersed for rapid cooling. Preferably the rod is maintained above the austenitic-ferritic change point until it has been received in the fluidised bed. Slow cooling between the austenitic-ferritic change point and the upper limit of the range in which fine pearlite is formed causes an undesirable coarse pearlitic structure to form in the rod. The rod is therefore preferably rapidly cooled between the austenitic-ferritic change point and the upper limit of the fine pearlite range. Preferably the rod is cooled through this range in not more than four seconds. However, in order to achieve the desired fine pearlitic structure it is necessary to maintain the rod within the fine pearlite range of temperatures for a period of time in the range 10 to 30 seconds.

In a particular example 0.7% carbon steel rod, 0.212 inch diameter, was coiled and transferred to a fluidised bed while still above 720° C. (the austenitic-ferritic change point) was cooled to 650° C. (the upper limit of the range in which fine pearlite is formed) within 4 seconds; that is the skin temperature was down to within the sorbitising range in 0.5 second and the whole of the rod section was within the sorbitising range within 4 seconds. The rod was held within the fine pearlite range (650° C. to 550° C.) for 15 seconds. The coil remained in the fluidised bed for 70 seconds altogether. The coil was then lifted out of the fluidised bed by the mechanism described, and transferred to a conveyor. The coil was then measured for ultimate tensile strength and hardness using the Vickers scale with the following results: Front 73.5 UTS and 355 VPN; middle 71.3 UTS and 341 VPN; back 73.2 UTS and 321 VPN.

The microstructure contained very little free ferrite and 90%+ fine pearlite. The scale was very light.

A corresponding test was carried out on a similar coil which was cooled in a conventional manner, with the following results: Front 56.2 UTS and 272 VPN; middle 58.1 UTS and 305 VPN; back 58.2 UTS and 295 VPN.

The microstructure contained free ferrite and resolvable pearlite while the scale was heavy.

It can be seen that the method according to the invention provides comparatively scale free rod. When the rate of cooling the coil in the fluidised bed is controlled according to the preferred form of the invention, a highly desirable fine pearlitic structure is achieved and the strength of the rod is increased. The coil has then a metallurgical structure ideal for cold drawing in a wire drawing machine. The cost of plant and labour needed for the conventional pickling and patenting process in wire drawing plants is thereby reduced resulting in considerable saving in production costs.

In addition the apparatus has the advantage that it permits a considerable saving in the space required for the cooling of the coils to a temperature when they may be handled.

Because of the high degree of control afforded by the several ways of varying the heat transfer rate, the fluidised bed can be used to cool coils of high or low carbon steel. Thus, when mild steel rod is being rolled, the heat transfer rate from the coil can be increased to the maximum, since the fluidised bed would then be operating only to cool the coil as rapidly as possible for the purpose of reducing scale formation.

With the arrangement as shown and described it is possible to observe the point in time at which the transformation to a fine pearlitic structure commences. This can be done by observing the temperature of the fluidising gas as it leaves the bed through the pipes 53. As stated above, the change which takes place in the steel during transformation of the structure to fine pearlite, is exothermic, so that when a coil is being cooled, the temperature of the gas in the pipe 53 will fall steadily until transformation commences, when its rate of descent will be reduced due to the heat given off by the change. When transformation is complete the temperature of the gas in the pipes 53 will resume its rate of descent thus indicating completion of transformation.

What I claim is:

1. A method of heat treating steel rod having a carbon content between 0.40% and 0.85% which comprises coiling the hot rod issuing from a rolling mill, bringing the hot coils into heat exchange relationship with an environment of fluidized particulate material before the rod has cooled below its austenitic-ferrite change point, controlling the temperature of the environment to form a fine pearlitic structure throughout the rod, and thereafter removing the coil from the environment.

2. A method of heat treating carbon steel rod which comprises coiling the hot rod leaving a rolling mill while retaining it at a temperature above 720° C., immersing the rod in coil form in a cooled fluidized bed, controlling the temperature of the bed such that the rod cools between the temperatures of 720° C. and 650° C. in not more than four seconds, and remains in the temperature range 650° C. to 550° C. for between ten and thirty seconds, and thereafter removing the coil from the bed.

3. A method according to claim 2 in which after removal from the fluidized bed, the rod is subjected to water cooling.

4. Apparatus for heat treating rod comprising in combination a rod rolling mill, a fluidized bed means for coiling said rod and for transferring it in coil form from said mill to said bed before it has cooled below its austenitic-ferritic change point, means for cooling the fluidized bed, and means for removing a coil from the bed.

5. Apparatus according to claim 4 including a cradle having a perforated base arranged to receive and support a coil in the bed, the cradle being mounted for vertical reciprocation relative to the bed.

6. Apparatus according to claim 4 in which the means for transferring the coil to the fluidized bed are arranged to transfer the coil from the coiling means to the bed in not more than three seconds.

7. Apparatus as claimed in claim 4 for heat treating rod in which said transferring means comprises a cradle located above the bed and having a perforated base arranged to support a coil of rod, the cradle being vertically reciprocable between a position within the bed and a position in which the base is above the bed.

8. Apparatus according to claim 7 including means for removing a coil off the cradle when it is in its position above the bed.

9. The method of heat treating steel rod having a carbon content between .40% and .85% which comprises the steps of introducing said rod in coil form at a temperature above the austenitic-ferritic change point into a fluidized bed, and cooling said rod in said bed to a temperature below the upper limit of the sorbitizing range, retaining said coil at a temperature within the sorbitizing range until a fine pearlitic structure is achieved throughout the rod, and thereafter removing said rod from said bed.

10. The method claimed in claim 9 in which the temperature of the rod is cooled from its austenitic-ferritic change point to the upper limit of the sorbitizing range in not more than 4 seconds and is maintained within the sorbitizing range for at least ten seconds.

11. A method according to claim 9 in which the coil is cooled below 550° C. before it is removed from the bed.

References Cited by the Examiner
UNITED STATES PATENTS

| | | | |
|---|---|---|---|
| 2,516,248 | 7/1950 | O'Brien | 148—155 |
| 2,673,820 | 3/1954 | Morgan | 148—12 |
| 2,756,169 | 7/1956 | Corson et al. | 148—156 |
| 3,011,928 | 12/1961 | Kopec et al. | 148—156 |
| 3,053,704 | 9/1962 | Munday | 148—20.3 |

DAVID L. RECK, *Primary Examiner.*

C. N. LOVELL, *Assistant Examiner.*